US012146278B2

(12) United States Patent
Yeh et al.

(10) Patent No.: US 12,146,278 B2
(45) Date of Patent: Nov. 19, 2024

(54) ENERGY AND AIR SAVING PNEUMATIC BARRIER DEVICE

(71) Applicants: Ching-Hsiu Yeh, Taichung (TW); Hsing-Chi Yeh, Taichung (TW)

(72) Inventors: Ching-Hsiu Yeh, Taichung (TW); Hsing-Chi Yeh, Taichung (TW)

( * ) Notice: Subject to any disclaimer, the term of this patent is extended or adjusted under 35 U.S.C. 154(b) by 287 days.

(21) Appl. No.: 17/864,423

(22) Filed: Jul. 14, 2022

(65) Prior Publication Data

US 2024/0018731 A1 Jan. 18, 2024

(51) Int. Cl.
*E01F 13/06* (2006.01)
*F15B 21/048* (2019.01)

(52) U.S. Cl.
CPC ............ *E01F 13/06* (2013.01); *F15B 21/048* (2013.01)

(58) Field of Classification Search
CPC ......... E01F 13/04; E01F 13/06; E01F 13/065; E01F 9/669; F15B 11/06; F15B 21/048
See application file for complete search history.

(56) References Cited

U.S. PATENT DOCUMENTS 3,943,972 A * 3/1976 Bitonti .................. F15B 11/064 137/596.17
3,975,861 A * 8/1976 Baump ................... E01F 13/06 49/28
4,391,568 A * 7/1983 Tenney ................... F04B 41/04 165/125
4,638,597 A * 1/1987 Lybecker ................ E06B 11/02 49/357
4,658,543 A * 4/1987 Carr ........................ B61L 29/04 49/192
4,681,479 A * 7/1987 Wagner ................... E01F 9/669 404/6
4,711,608 A * 12/1987 Ghusn ..................... E01F 13/12 404/6
5,136,810 A * 8/1992 DeWitt, III ............. E01F 13/06 49/141
6,004,103 A * 12/1999 Fisher ..................... F04B 49/02 417/415

(Continued)

FOREIGN PATENT DOCUMENTS

JP 2008025293 A * 2/2008
WO WO-9518266 A1 * 7/1995 ............. E01F 13/06

*Primary Examiner* — Thomas E Lazo

(57) ABSTRACT

An energy and air saving pneumatic barrier device is provided. The pneumatic barrier device includes a pneumatic component, a shaft component, switch components, a barrier component and a driving component. In which, the pneumatic component includes an air supply chamber connected with an air compressor, an actuator portion and an electric control portion, the shaft component is mounted on the actuator portion, and the switch components are mounted on the actuator portion. Further, the electric control portion is electrically connected with the switch components, the barrier component is mounted on one side of the shaft component. The two switch components control the barrier component, and the shaft component raises and lowers the barrier component. The driving component is mounted on another side of the shaft component, the air supply chamber supplies the air to the driving component to operate and control the shaft component.

8 Claims, 8 Drawing Sheets

(56) References Cited

U.S. PATENT DOCUMENTS

| | | | | | |
|---|---|---|---|---|---|
| 6,126,402 | A * | 10/2000 | Fisher | .................. | F04B 49/035<br>417/42 |
| 9,677,314 | B2 * | 6/2017 | Houser | .................. | E05F 15/59 |
| 2017/0370144 | A1 * | 12/2017 | Gall | ........................ | E05F 15/53 |
| 2020/0087874 | A1 * | 3/2020 | Hosokawa | .............. | E01F 13/06 |

* cited by examiner

ENERGY AND AIR SAVING PNEUMATIC BARRIER DEVICE

FIELD OF THE DISCLOSURE

The present disclosure is related to an energy and air saving pneumatic barrier device, in particular to the technology used in the field of lifting equipment.

BACKGROUND OF THE DISCLOSURE

Most of the lifting barrier devices and warning devices for parking and traffic control on roadways on the market are composed of electric motors and deceleration mechanisms. Therefore, the motor needs to be started repeatedly for each movement, which causes a waste of electricity, especially when the motor is started instantaneously, the electricity in need is particularly high.

The above descriptions can be found in, for example, TW M558288, entitled "License plate recognition apparatus and license plate recognition fence" and TWM508743, entitled "Parking fee inspection fence device." The listed conventional arts are the combination of the starter motor and the deceleration device. In addition to the above problems, when the device is applied to medium and large parking lots that hundreds of vehicles enter and exit every day, and the barrier in used also starts the motor hundreds of times for lifting and lowing the barrier, so that the electricity consumption is also very high. Therefore, the electricity bill has become the biggest burden on the parking lots over time. Moreover, the barriers on the market are all consisted of electric motors and reduction gears. Therefore, when it comes to the electricity outage, the barrier will not be able to move up, and causes inconvenience and trouble that the vehicles would be trapped in the parking lot.

SUMMARY OF THE DISCLOSURE

The main objective of the present disclosure is to provide a pneumatic barrier device with effect of energy saving and carbon reduction, to improve the disadvantage of the conventional barrier that is driven by a starter motor and a reducer, and the motor and the reducer restart every raise and lower movement with electricity consumption, which will cause waste of electricity and expensive payment of electricity bills. Further, the motor and the reducer could not operate when the electricity outage, so that the barrier device could not raise and down. In order to achieve the above-mentioned objective and effort, the present disclosure provides an energy and air saving pneumatic barrier device including: a pneumatic component, including an air supply chamber, an actuator portion and an electric control portion, the air supply chamber being connected with an air compressor; a shaft component mounted on the actuator portion; two switch components mounted on the actuator portion correspondingly and near the shaft component, and the electric control portion electrically connected with the switch components; a barrier component mounted on one side of the shaft component; wherein the two switch components control the barrier component, and the shaft component raises and lowers the barrier component; a driving component mounted on another side of the shaft component; wherein, the air supply chamber supplies the air to the driving component to operate and control the shaft component.

BRIEF DESCRIPTION OF THE DRAWINGS

The described embodiments may be better understood by reference to the following description and the accompanying drawings in which.

DETAILED DESCRIPTION OF THE EXEMPLARY EMBODIMENTS

Figure 1:
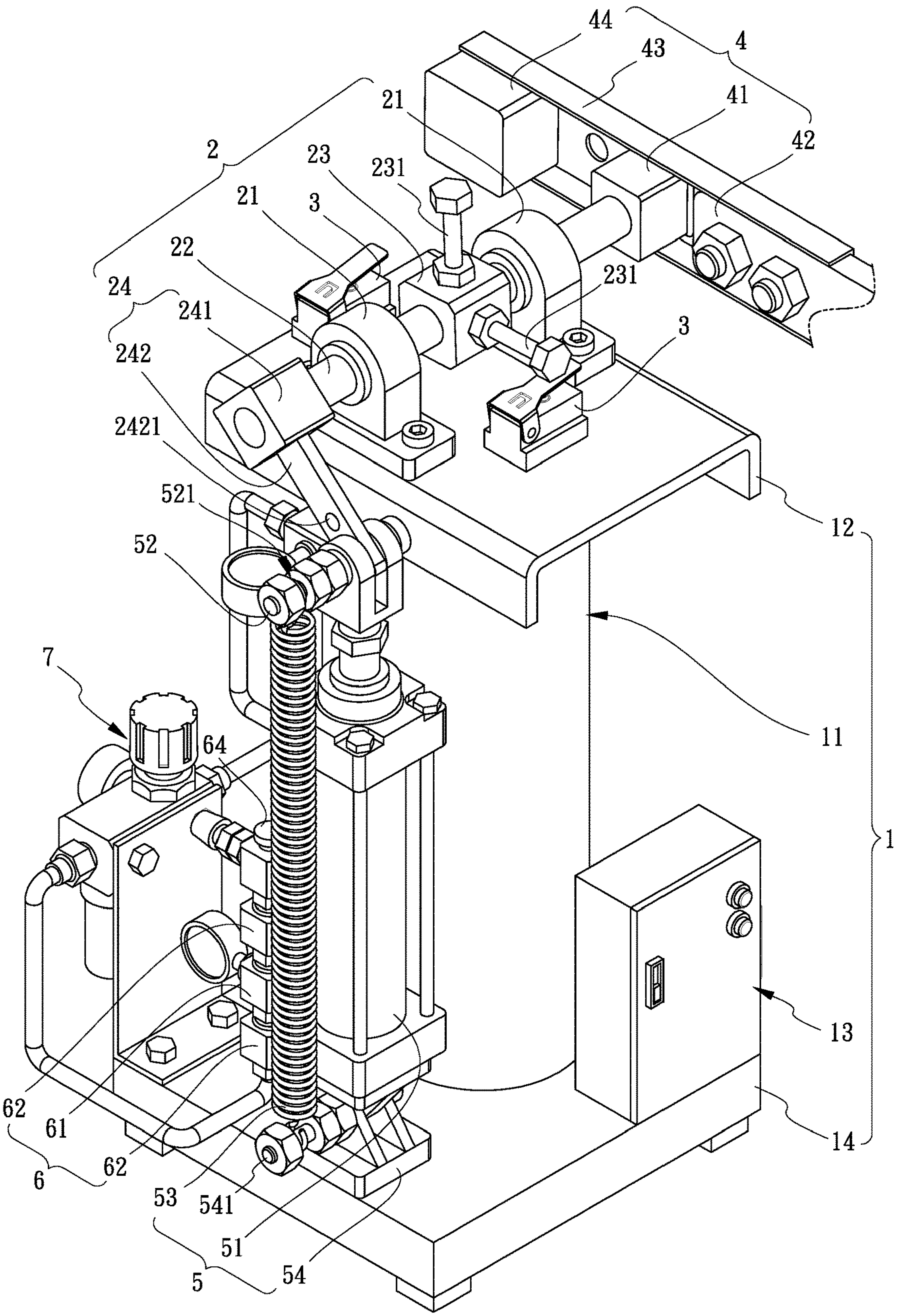
FIG. 1 is a perspective schematic view of the present disclosure.

Referring to FIG. 1-FIG. 8, the present disclosure discloses an energy and air saving pneumatic barrier device for use in parking lots (parking garages), road maintenance, etc., and the device can be fixedly mounted on the ground or can be removable to use anywhere. The energy and air saving pneumatic barrier device includes: a pneumatic component 1 in T-shaped from the side view, including an air supply chamber 11, an actuator portion 12 and an electric control portion 13, the air supply chamber 11 being connected with an air compressor 10; two switch components 3 mounted on the actuator portion 12 correspondingly and near the shaft component 2, the two shaft components 3 being spaced apart, and electrically connected with the electric control portion 13; a barrier component 4 mounted on one side of the shaft component 2; wherein the two switch components 3 control the barrier component 4, and the shaft component 2 raises and lowers the barrier component 4; a driving component 5 mounted on another side of the shaft component 4; wherein, the air supply chamber 11 supplies the air to the driving component 5 to operate and control the shaft component 2.

In order to solve the conventional problem, the present disclosure provides a pneumatic method instead of the original electric power output, and the air is low air pressure, so that it is necessary to use the air compressor 10 to fill the air supply chamber 11 with air first. After the air supply chamber 11 is filled with air and enters the driving component 5 for operating, the driving component 5 drives the shaft component 2 to rotate, so as to raise and lower the barrier component 4 to block and release. During the whole process, only a little electricity is used when the air compressor 10 inflates the air supply chamber 11. As long as the air supply chamber 11 is within the working pressure range, the air compressor 10 is in a stopped state. By using the air supply and transportation to control the lifting and lowering of the barrier component 4 can save electricity and the cost to achieve the effect of energy saving and carbon reduction. During the electricity outage, the electric control portion 13 can provide the operation via the DC battery, and the barrier component 4 can the lifting and lowering, which will not be affected by the electricity outage. Moreover, the air compressor 10 is mainly used with low pressure. For example, when the air supply chamber 11 is set to a pressure of $3KG/CM^2$~$7KG/CM^2$ and when the internal pressure is $7KG/CM^2$, it is enough to provide barrier component 4 for more than 65 operations (one lifting and one lower as one operation). Therefore, it is very suitable for small, medium and large parking lots (parking garages).

Firstly, regarding the pneumatic component 1, the air supply chamber 11 is hollow, and the outer side of the air supply chamber 11 has an outlet valve 111 and an intake valve 112. The outlet valve 111 and the intake valve 112 are connected with the inside space of the air supply chamber 11. The air intake hole seat 112 is connected with the air compressor 10 by a flexible pipe, and the outlet valve 111 will be assembled with the air compressor 10 and communicated with the driving component 5. The air stored in the air supply chamber 11 is supplied to the driving component 5, as shown in FIG. 1.

Further, the structure of the pneumatic component 1 can be read in conjunction with FIG. 1, the pneumatic component 1 includes an air supply chamber 11, an actuator portion 12, an electric control portion 13, and a bottom portion 14. The air compressor 10 is mounted on the bottom portion 14, and the air supply chamber 11 is arranged to stand on the bottom portion 14. The actuator portion 12 is connected to the top end of the air supply chamber 11 and provided the shaft component 2 for installation.

Figure 5:
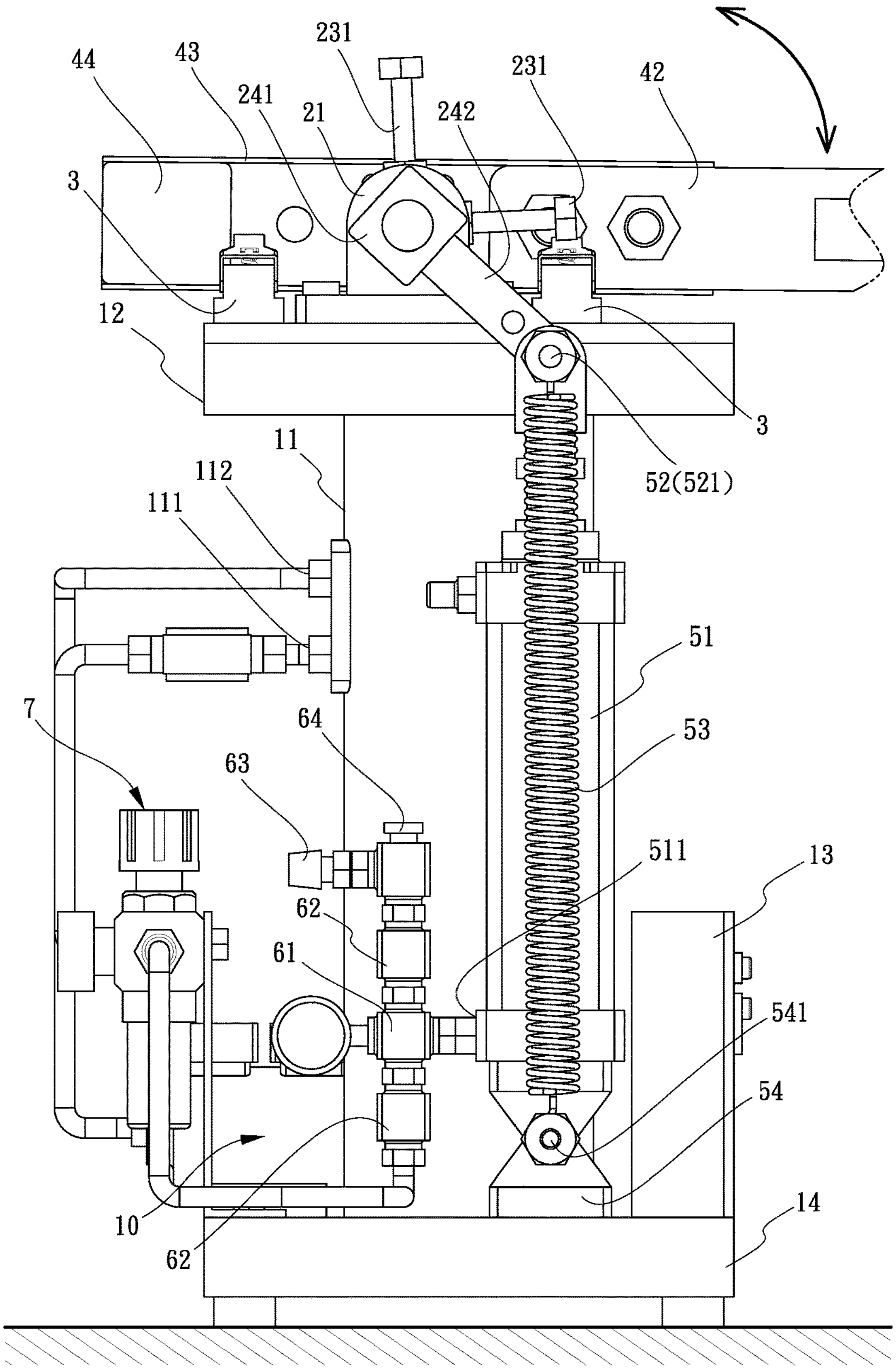
FIG. 5 is a planar schematic view of the of the present disclosure.
Figure 7:
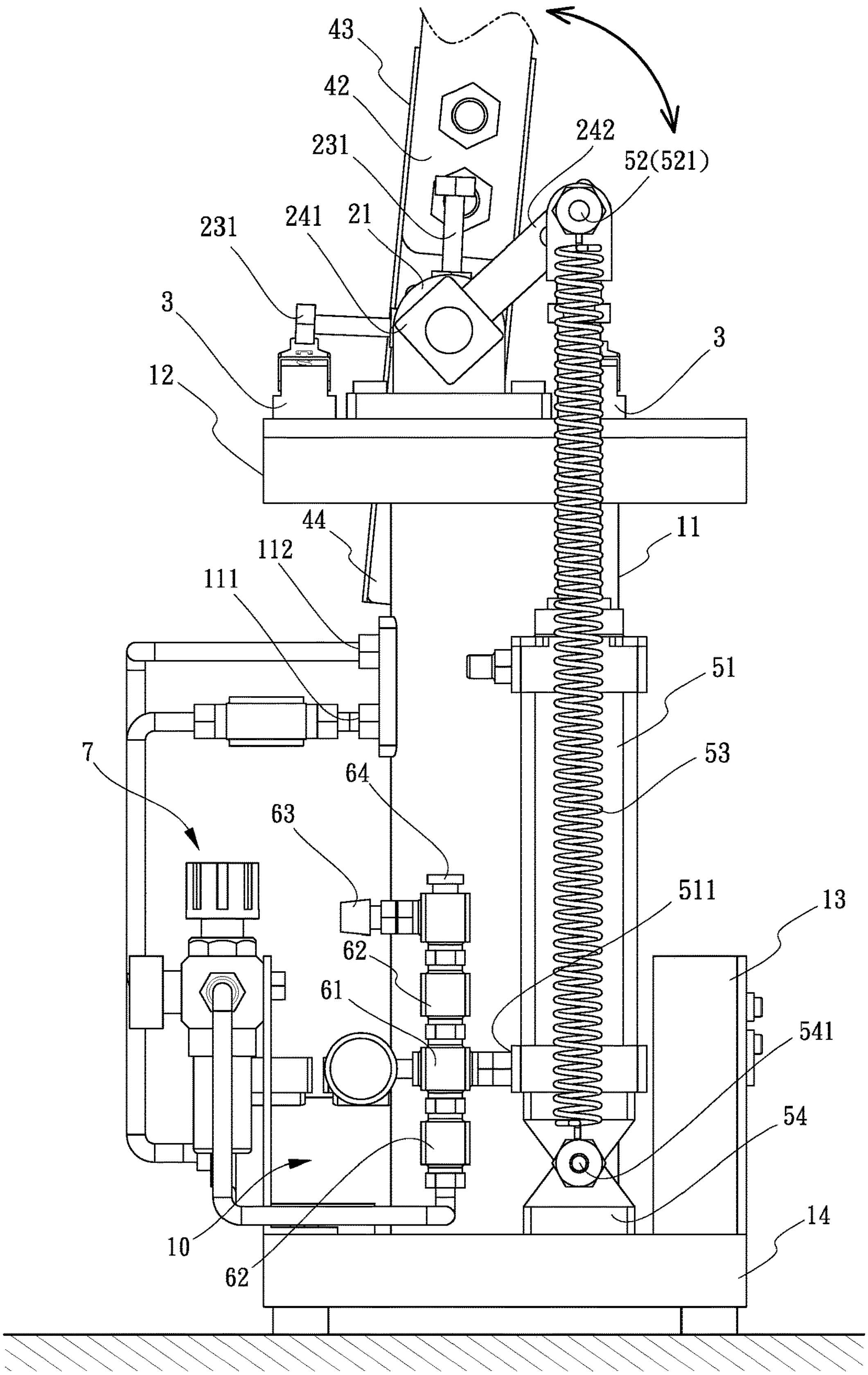
FIG. 7 is a schematic view of movement of the present disclosure.

The shaft component 2 includes two shaft bases 21 in an arch-shape, a shaft center 22, a switch 23 and a driving member 24. The two shaft bases 21 are erected on the actuator portion 12 and spaced apart, the switch 23 is in a square shape and located between the two shaft bases 21, and the shaft center 22 passes through the two shaft bases 21 and the switch 23. In order to make the shaft center 22 rotate smoothly, bearings are installed in the two shaft bases 21 respectively, thereby maintaining the smooth rotation of the shaft center 22. Further, one end of the shaft center 22 is connected to the driving member 24, and the other end of the shaft center 22 is connected to the barrier component 4. Moreover, the switch 23 has two touch levers 231, the rotation of the switch 23 drives the two touch levers 231 to move and touch the two switch components 3 in turn (as shown in FIGS. 5 and 7), and the other side of the driving member 24 is connected with the driving component 5, and the driving component 5 controls the driving member 24 to pivot, and interlinked with the shaft center 22 and the barrier component 4 to operate in the same time.

The most important connection between the shaft component 2 and the driving component 5 is the driving member 24, including a base portion 241 connected with one end of the shaft center 22 and an adjustment portion 242 connected with the other end of the shaft center 22, wherein, the adjustment portion has a plurality of adjustment holes 2421. Each of the plurality of adjustment holes 2421 can be adjusted movably according to the weight and length of the barrier component 4.

Figure 2:
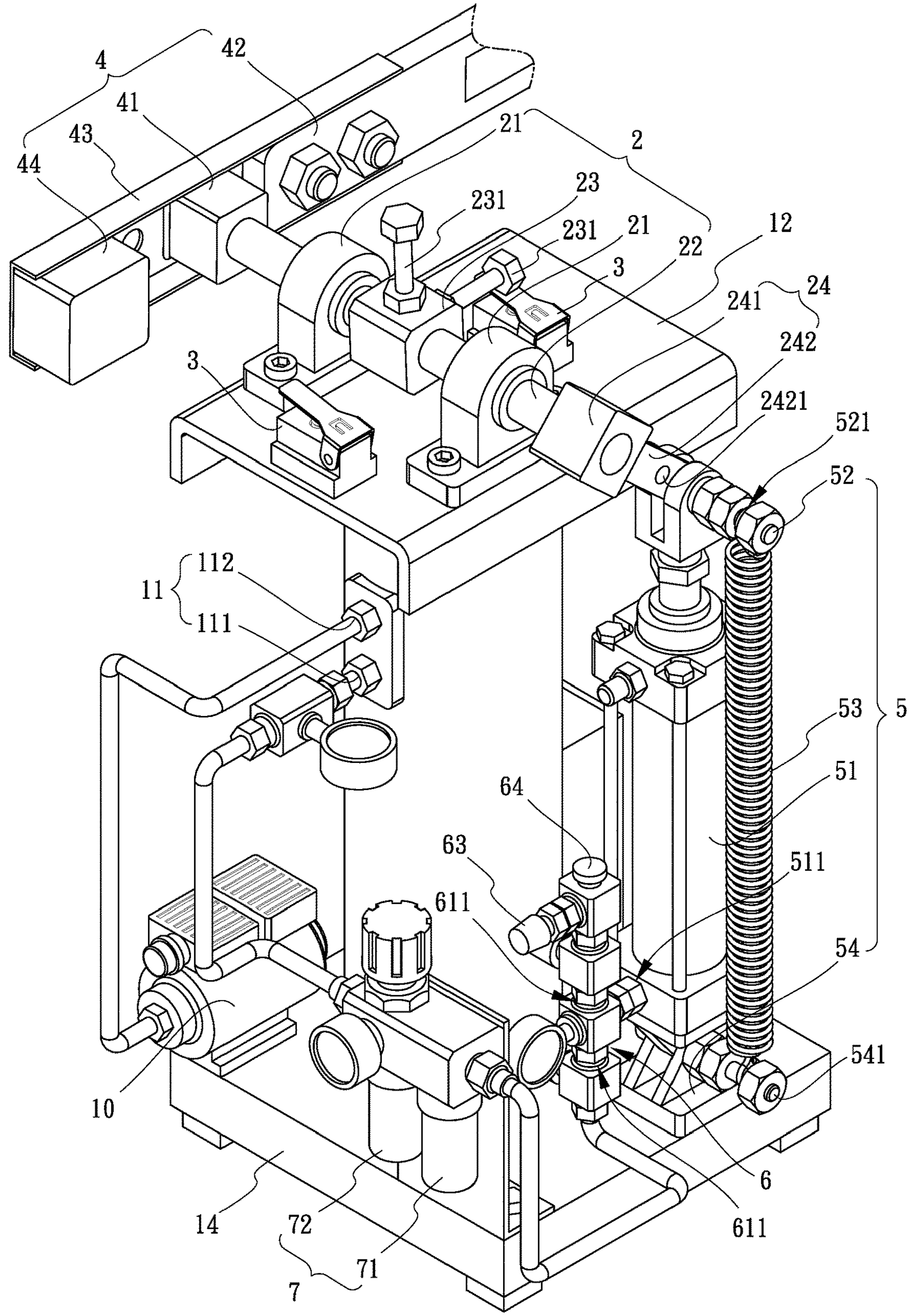
FIG. 2 is another schematic perspective view of another side of the present disclosure.
Figure 3:
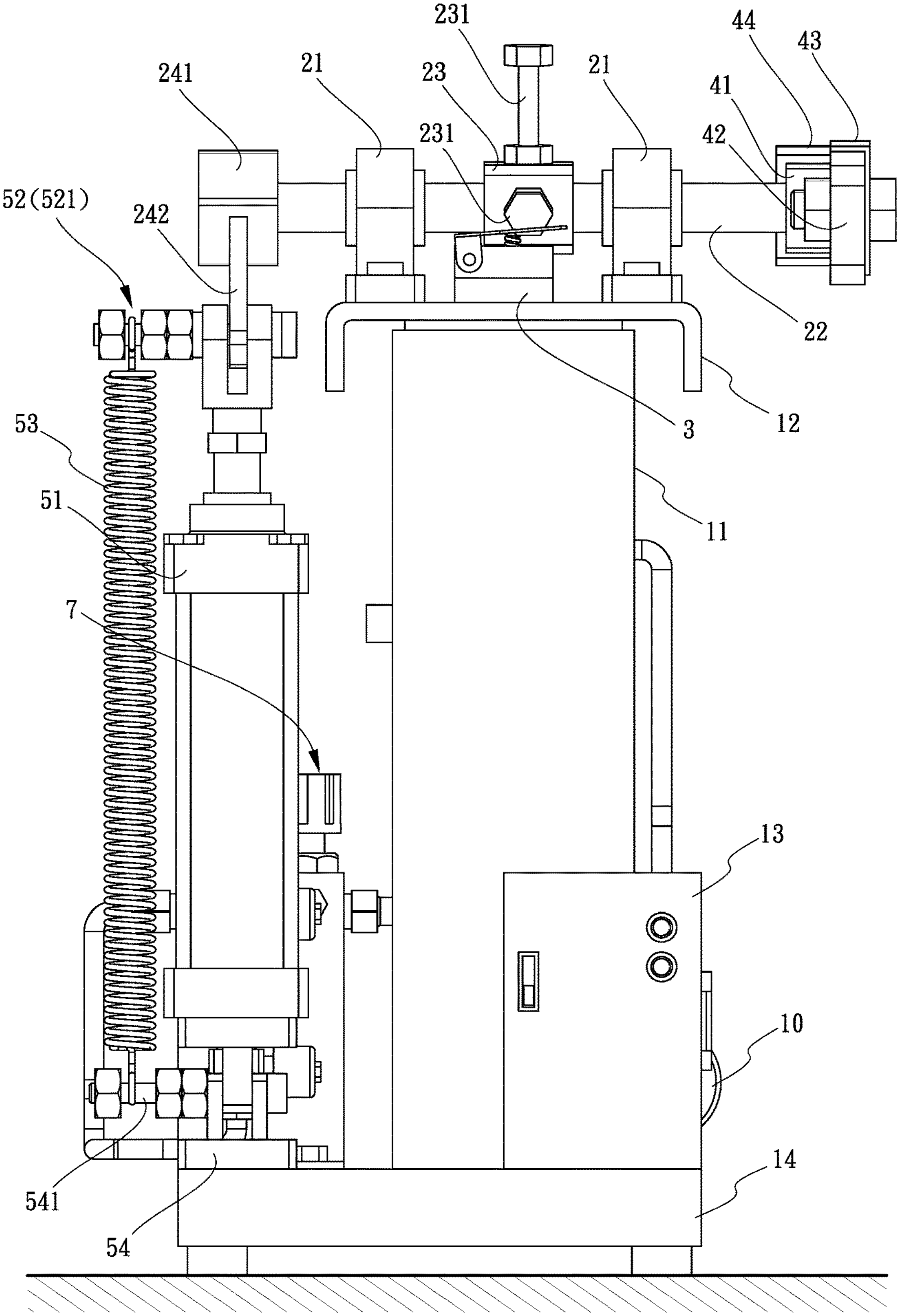
FIG. 3 is a planar schematic view of the present disclosure.
Figure 6:
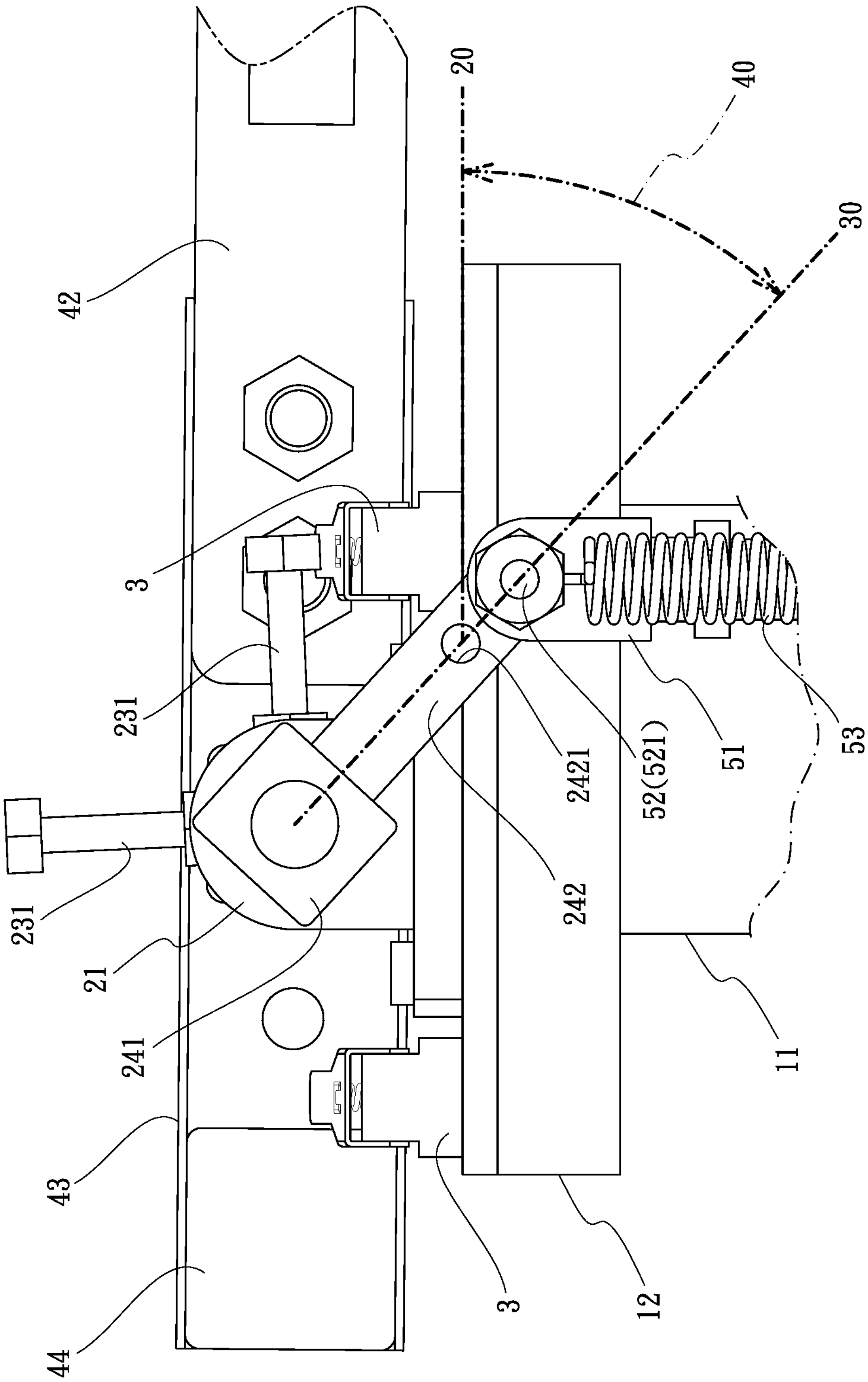
FIG. 6 is a partial enlarged schematic view of FIG. 5.
Figure 8:
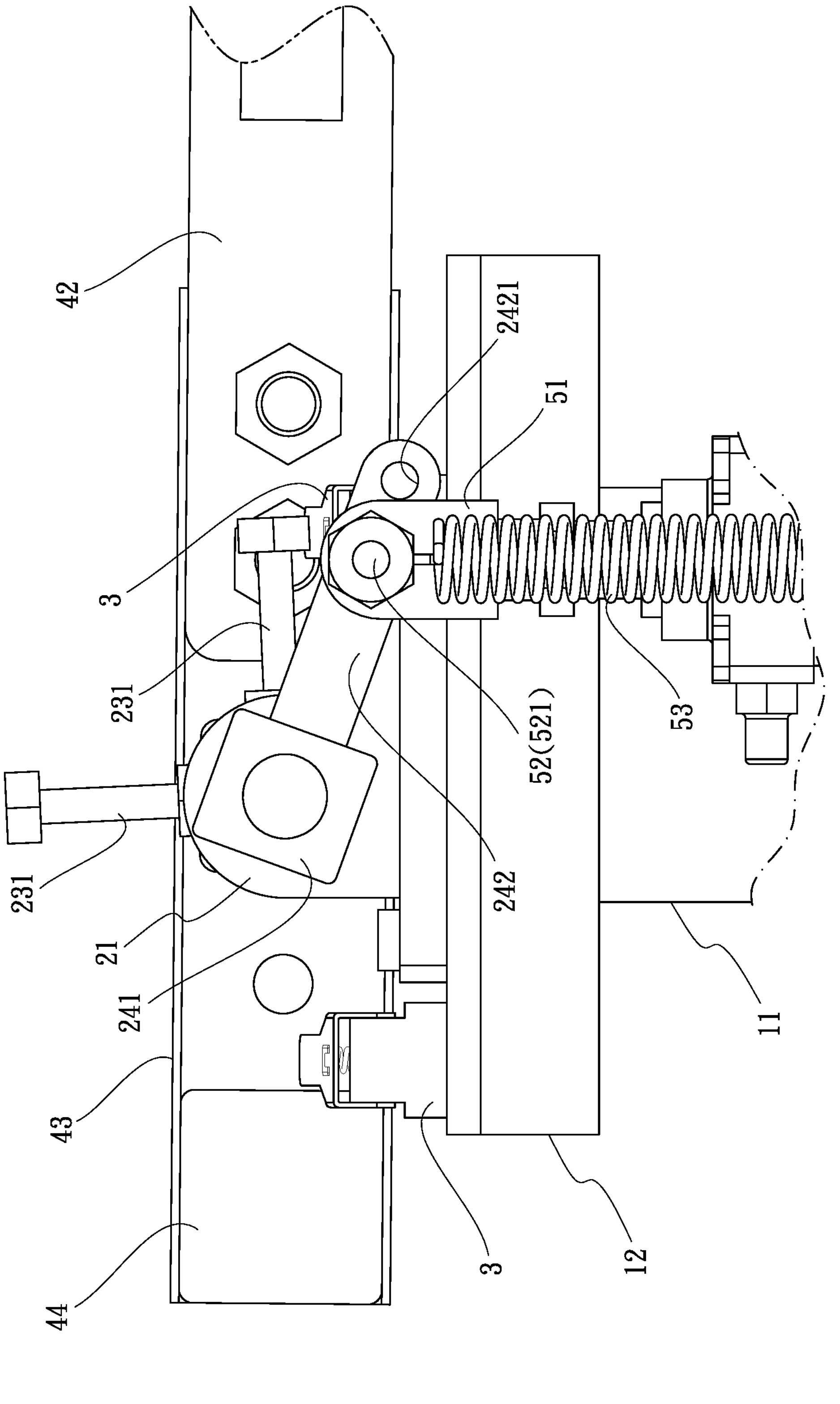
FIG. 8 is a schematic view of adjustment of the telescopic air pressure member and the driving member.

Moreover, a first axis 20 is defined by the planar side of the actuator portion 12, a second axis 30 is defined by the driving member 24, and the first axis 20 and the second axis 30 form an angle from 15 degrees to 45 degrees. Preferably, the angle is 45 degrees. Such angle provides a shorter movement path (displacement) for the barrier component 4 during the pivoting process, and is also the most air-saving and smoothest linear action for the driving component 5 to quickly interlock the barrier component 4, as shown in FIGS. 2, 6 and 8.

The driving component 5 is the main drive core of the present disclosure, the driving component 5 includes a telescopic air pressure member 51, an adjustment shaft 52, a spring 53 and a pivot base 54. The pivot base 54 is mounted on the pneumatic component 1, and the bottom of the telescopic air pressure member 51 is disposed on the pivot base 54, the top of the telescopic air pressure member 51 is pivotally engaged with the end with a plurality of adjustment holes 2421 of the adjustment portion 242, and the adjustment shaft 52 is through the adjustment portion 242 and the telescopic air pressure member 51. Further, one end of the adjusting shaft 52 that is away from the pneumatic component 1 protrudes out of the adjustment portion 242 to form an interlock portion 521 with the telescopic air pressure member 51, and one end of the spring 53 is sleeved on the interlock portion 521, and the other end of the spring 53 is hooked on a rod 541 of the pivot base 54. The telescopic air pressure member 51 expands and contracts by the air supplying and transporting from the air supply chamber, and the adjusting shaft 52 allows the telescopic air pressure member 51 to swing in conjunction with the driving member 24, at the same time pull the spring 53 to elastically store force. During the expansion and contraction of the telescopic air pressure member 51, the pivot base 54 provides the telescopic air pressure member 51 to buffer swing, and the adjusting shaft 52 can be movably assembled with the adjusting portion 242 to adjust the assembly position of the telescopic air pressure member 51. Moreover, as to the spring 53, through the spring 53 and under the elastic tension, the swing of the barrier component 4 can be quickly reset, so that the touch levers 231 can quickly touch the switch component 3 to close the solenoid valve 62. The spring 3 can also provide more stable operation of the shaft component 2 and the barrier component 4, and the shaft component 2 interlocking the barrier component 4 will be less likely to jump or fail to return, as shown in FIGS. 1 and 8.

Lastly, the barrier component 4 includes a pivot block 41, a rod member 42, a transfer piece 43 and a weight block 44. The pivot block 41 is fixedly connected to the shaft center 22, the transfer piece 43 has a U-shape from the longitudinal section, and is assembled with outer surface of the pivot block 41, and the two ends of the transfer piece 43 extend toward both sides of the pivot block 41 respectively, the rod member 42 and the weight block 44 are respectively movably mounted on the two ends of the transfer piece 43. The weight block 44 can be movably assembled on the transfer piece 43. When the shaft center 22 is driven to pivot, the pivoting of the shaft center 22 is accelerated by the weight of the weight block 44 to change the position of the rod member 42, and because of the weight block 44, the telescopic air pressure member 51 can be quickly expanded and contracted, and therefore it saves the air consumption in the air supply chamber 11, as shown in FIG. 1.

In addition, the core value of the present disclosure is to achieve the effect of energy saving and air saving. The telescopic air pressure member 51 adopts the design of a single-acting pneumatic element. Further, the air pressure control member 6 is connected to the bottom end of the telescopic air pressure member 51 and is provided with an air inlet portion 511. The air pressure control member 6 includes a communication valve 61 connected to the air inlet portion 511 and two solenoid valves 62. The two solenoid valves 62 are respectively arranged on the left and right sides of the communication valve 61 for the functions of air inlet and outlet.

When the user controls the device to move upward, the signal is activated by the electric control portion 13. When the solenoid valve 62 receives the instruction, the valve is energized to open and allows the air to enter the telescopic air pressure member 51 and lift to the set position. The touch lever 231 is displaced to the switch component 3 for blocking, and the solenoid valve 62 immediately turns off the power supply so that the air no longer enters. When the user controls the device to move downward, the lowing signal is activated by the electric control portion 13. When the solenoid valve 62 receives the instruction, the valve is opened to let the air discharge, and through the speed control valve 64 to decelerate and the air pressure is discharged through the silencer valve 63, then the telescopic rod is lowered and the touch lever 231 cuts off the power supply of the switch component 3, so that the power valve of the solenoid valve 62 is closed again. The two solenoid valves 62 show the intake valve through which the air first passes through the air supply chamber 11 and the outlet valve through which the gas is exhausted through the telescopic air pressure member 51. The communication valve has three connection ports 611, one of which is connected to the air inlet 511, and the two solenoid valves 62 are respectively connected to the other two connecting ports 611; wherein one of the two solenoid valves is further connected to a silencer valve 63 for eliminating the noise of gas discharge and a speed control valve 64 for controlling the speed of the exhaust, as shown in FIGS. 1 and 2.

The air entering the telescopic air pressure piece 51 has to be adjusted first, that is, the working pressure is 2.5~3KM/CM$^2$, as shown in FIG. 1. Furthermore, a pressure regulating valve and a filter member 7 are mounted on the pneumatic component 1 and adjacent to the driving component 5. The outlet valve 111 of the air supply chamber 11 is connected with a filter member 7 by a flexible pipe, and the filter member 7 includes a lubricating portion 71 and an impurity filter portion 72. The air in the air supply chamber 11 is conducted to the filter member 7 and passed through the impurity filter portion 72 for a first filtering, then passed to the lubricating portion 71 for more the lubricity, so as to remove impurities and increase lubricity before the air entering the driving component 5.

Figure 4:
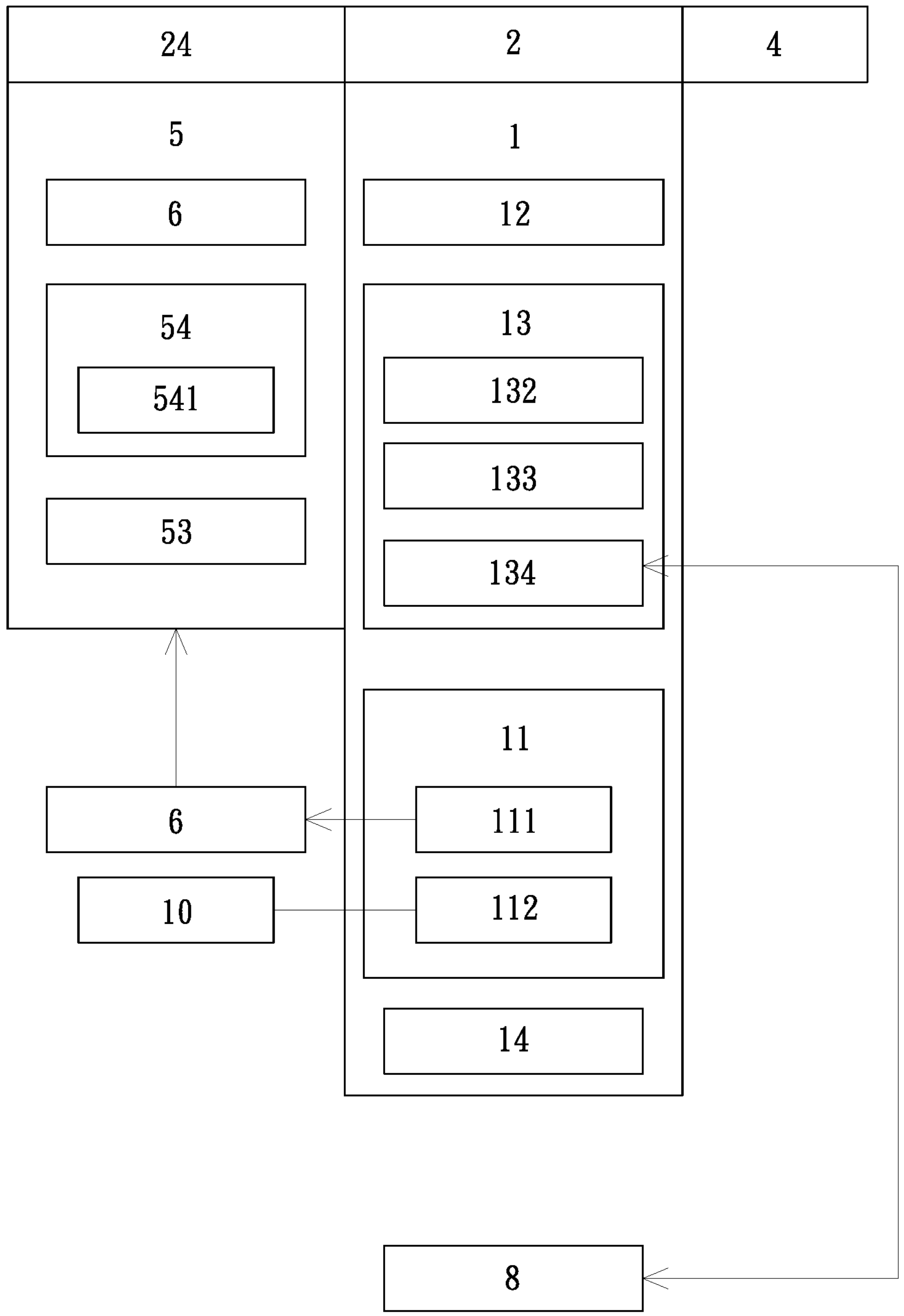
FIG. 4 is a simple structural block schematic diagram of the present disclosure.

Lastly, the electric control portion includes a power supply 132 and a main controller 133, wherein the power supply 132 is electrically connected with the main controller 133 and provides electricity for operation, the two switch components 3 and each of the solenoid valves 62 are electrically connected with the main controller 133. Further, the main controller 133 has a wireless receiving unit 134, and a wireless remote control 8 is provided and wireless connected with the wireless receiving unit 134 to control the main controller 133. Therefore, the user can use the wireless remote control 8 to control the main controller 133, and the main controller 133 controls the on and off of each of the solenoid valves 62, in conjunction with the two touch levers 231 moving and touching the two switch components 3 in turn, the displacement of the rod member 42 is effectively controlled, as shown in FIGS. 4, 6 and 8.

What is claimed is:

1. A pneumatic barrier device, comprising:

a pneumatic component, including an air supply chamber, an actuator portion and an electric control portion, the air supply chamber connected with an air compressor;

a shaft component mounted on the actuator portion;

two switch components mounted on the actuator portion correspondingly and near the shaft component, and electrically connected with the electric control portion;

a barrier component mounted on one side of the shaft component; wherein the two switch components control the barrier component, and the shaft component raises and lowers the barrier component;

a driving component mounted on another side of the shaft component; wherein, the air supply chamber supplies the air to the driving component to operate and control the shaft component;

wherein the shaft component includes two shaft bases, a shaft center, a switch and a driving member; wherein, the two shaft bases are mounted on the actuator portion, and the switch is located between the two shaft bases and the shaft center and through the two shaft bases and the switch; wherein, one end of the shaft center is connected to the driving member, and the other end of the shaft center is connected to the barrier component; wherein, the switch has two touch levers, the rotation of the switch drives the two touch levers to move and touch the two switch components in turn, and the other side of the driving member is connected with the driving component, and the driving component controls the driving member to pivot, and interlinked with the shaft center and the barrier component to operate.

2. The pneumatic barrier device according to claim 1, wherein the inside of the air supply chamber is hollow, and the outer side of the air supply chamber has an outlet valve and an intake valve connected with the inside space of the air supply chamber; the intake valve is connected to the air compressor for air filling, and the outlet valve outputs the air stored in the air supply chamber to the driving component; wherein, the actuator portion is mounted on the upper side of the air supply chamber, and the air supply chamber and the electric control portion are disposed on a bottom portion.

3. The pneumatic barrier device according to claim 2, further including a filter member mounted on the pneumatic component and adjacent to the driving component; wherein, the outlet valve is connected with a filter member by a flexible pipe, and the filter member includes a lubricating portion and an impurity filter portion; wherein, the air in the air supply chamber is conducted to the filter member and passed through the impurity filter portion for a first filtering, then passed to the lubricating portion.

4. The pneumatic barrier device according to claim 1, wherein the driving member includes a base portion connected with one end of the shaft center and an adjustment portion connected with the other end of the shaft center; wherein, the adjustment portion has a plurality of adjustment holes, the driving component is connected with the adjustment portion and is adjustable by the location of the adjustment portion; wherein, a first axis is defined by the planar side of the actuator portion, a second axis is defined by the driving member, the first axis and the second axis form an angle from 15 degrees to 45 degrees.

5. The pneumatic barrier device according to claim 4, wherein the driving component includes a telescopic air pressure member, an adjustment shaft, a spring and a pivot base; wherein, the pivot base is disposed on the pneumatic component, the bottom of telescopic air pressure member is disposed on the pivot base, the top of the telescopic air pressure member is engaged with the end of the adjustment portion, and the adjustment shaft is through the adjustment portion and the telescopic air pressure member; wherein, one end of the adjusting shaft that is away from the pneumatic component protrudes out of the adjustment portion to form an interlock portion with the telescopic air pressure member; wherein, one end of the spring is sleeved on the interlock portion, and the other end of the spring is sleeved on a rod of the pivot base; wherein, the telescopic air pressure member supplied and transported by the air supply chamber to expand and contract, and at the same time pull the spring to elastically store force, and pivot base forms a buffer swing during the expansion and contraction of the telescopic air pressure member.

6. The pneumatic barrier device according to claim 5, further including an air pressure control member connected to an air inlet of the bottom of the telescopic air pressure member; wherein, the air pressure control member includes a communication valve and two solenoid valves, the communication valve has a three-connection port, one of which is connected to the air inlet, and the two solenoid valves are respectively connected to the other two connecting ports of the communication valve; wherein, one of the two solenoid valves is further connected to a silencer valve for eliminating the noise of gas discharge and a speed control valve for controlling the speed of the exhaust.

7. The pneumatic barrier device according to claim 6, wherein the electric control portion further includes a power supply and a main controller; wherein, the power supply is electrically connected with the main controller and provides electricity for operation, the two switch components and each of the solenoid valves are electrically connected with the main controller; wherein, the main controller has a wireless receiving unit and a wireless remote control wireless connected with the wireless receiving unit to control the main controller.

8. The pneumatic barrier device according to claim 1, wherein the barrier component includes a pivot block, a rod member, a transfer piece and a weight block; wherein, the pivot block is fixedly connected to the shaft center, and the transfer piece is assembled with the pivot block and extends toward both sides respectively, and the rod member and the weight block are respectively movably mounted on the two ends of the transfer piece, and the position of the weight block on the transfer piece can be adjusted movably according to the length and weight of the rod member.

* * * * *